United States Patent [19]

Hyuga et al.

[11] Patent Number: 4,794,287
[45] Date of Patent: Dec. 27, 1988

[54] LINEAR MOTOR

[75] Inventors: Takao Hyuga, Soraku; Kazuhiko Ueda, Nara, both of Japan

[73] Assignee: Sharp Kabushiski Kaisha, Osaka, Japan

[21] Appl. No.: 929,816

[22] Filed: Nov. 13, 1986

[30] Foreign Application Priority Data

Nov. 13, 1985 [JP] Japan .................. 60-255790
Apr. 30, 1986 [JP] Japan .................. 61-102993

[51] Int. Cl.$^4$ ............................ H02K 41/00
[52] U.S. Cl. ..................................... 310/13
[58] Field of Search ....................... 310/12–14, 310/27

[56] References Cited

U.S. PATENT DOCUMENTS

| | | | |
|---|---|---|---|
| 3,581,127 | 5/1971 | Warnett | 310/13 |
| 4,314,295 | 2/1982 | Frandsen | 310/13 X |
| 4,322,762 | 3/1982 | Manzke et al. | 310/13 X |
| 4,415,941 | 11/1983 | Gibeau et al. | 360/106 |
| 4,500,529 | 5/1986 | Naikaido et al. | 310/13 X |

FOREIGN PATENT DOCUMENTS

| | | |
|---|---|---|
| 2360973 | 6/1974 | Fed. Rep. of Germany . |
| 2908413 | 4/1979 | Fed. Rep. of Germany . |
| 83/01872 | 5/1988 | PCT Int'l Appl. . |
| 2117163 | 10/1983 | United Kingdom . |

OTHER PUBLICATIONS

Patent Abstracts of Japan, vol. 8, No. 4, 1/84.

*Primary Examiner*—Mark O. Budd
*Attorney, Agent, or Firm*—Birch, Stewart, Kolasch & Birch

[57] ABSTRACT

A linear motor for magneto-optical disk drive or the like, including a movable member, a guide for guiding the movable member, a driving yoke provided at a central portion of the guide, an actuating member provided at the movabole member and a coil wound around the actuating member such that the actuating member is axially movably fitted around the guide. In the linear motor, a height of a line of action of a driving force produced by electromagnetic action between the coil and the driving yoke is so set as to coincide with a height of a centerline of the guide.

10 Claims, 3 Drawing Sheets

LINEAR MOTOR

BACKGROUND OF THE INVENTION

The present invention generally relates to motors and more particularly, to a linear motor for magneto-optical disk drive or the like.

Conventionally, in a magneto-optical disk drive, a linear motor has been used for driving an optical head. The known linear motor includes a guide for guiding a movable portion having the optical head mounted thereon and a driving yoke provided separately from and in parallel with the guide such that the movable portion is displaced by a driving force produced by an electromagnetic force between the driving yoke and a coil of the movable portion. However, since the guide and the driving yoke are provided separately from and in parallel with each other, the prior art magneto-optical disk drive has such drawbacks that since the movable portion becomes greater in weight due to increase of size of the movable portion, motion characteristics of the movable portion deteriorate and that since pitching of the movable portion takes place during drive of the movable portion due to the difference in height of a line of action of the driving force applied to the movable portion and the height of a center of the guide, stable recording and reproducing operations cannot be performed.

Furthermore, in the known linear motor, the following problem arises. Namely, since a reaction (reaction force) against the driving force applied to the movable portion is reversely applied to a base of the prior art magneto-optical disk drive, a bending movement is generated in the base by this reaction force, so that a resonance mode of torsion or bending appears in the base and thus, the movable portion is adversely affected by vibrations of the resonance mode of the base. As a result, the gain margin and phase margin of the movable portion are decreased and thus, stable recording, reproducing and erasing operations cannot be performed.

SUMMARY OF THE INVENTION

Accordingly, the present invention has been developed with a view to eliminating the above described disadvantages of the conventional linear motors and has for its object to provide a linear motor for a magneto-optical disk drive or the like, which is made smaller in size and lighter in weight so as to have improved motion characteristics and is capable of positively driving a movable portion in a rectilinear direction without pitching of the movable portion.

Another object of the present invention is to provide a linear motor by which the movable portion is not subjected to vibrations of a resonance mode of a base such that expected characteristics of the movable portion can be obtained.

In order to accomplish these objects of the present invention, a linear motor for magneto-optical disk drive, according to one preferred embodiment of the present invention includes a movable member, a guide for guiding the movable member, a driving yoke provided at a central portion of the guide, an actuating member provided at the movable member and a coil wound around the actuating member such that the actuating member is axially movably fitted around the guide. The improvement includes a height of a line of action of a driving force produced by an electromagnetic action between the coil and the driving yoke being so set as to coincide with a height of a centerline of the guide.

By the above described arrangement of the linear motor of the present invention, the guide is fitted around the driving yoke such that the guide and the driving yoke form the double construction used not only as a guide but for generating the electromagnetic force. Accordingly, since the movable member is made compact in size and light in weight, motion characteristics of the movable member are improved and the linear motor is made compact in size as a whole. Meanwhile, since the height of the line of action of the driving force caused by the electromagnetic force between the energized coil and the driving yoke coincides with the height of the centerline of the guide, the guide member is displaced smoothly in a rectilinear direction, thereby resulting in a stable recording and reproducing operation.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
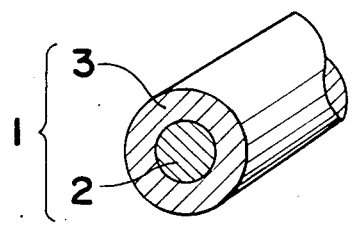
FIG. 1 is a perspective sectional view of a guide shaft employed in a linear motor according to a first embodiment of the present invention.

Referring now to the drawings, there is shown in FIGS. 1 to 4, a linear motor K1 for magneto-optical disk drive, according to a first embodiment of the present invention. FIG. 1 shows a guide shaft 1 of double construction, which is constituted by a driving yoke 2 disposed at its center and a guide 3 for guiding a movable portion 4, which is coaxially fitted around the driving yoke 2. The driving yoke 2 is formed into a rod having a circular cross section, while the guide 3 has a cylindrical shape. The driving yoke 2 is made of, for example, rolled steel for general structure, SS 41 (Japanese Industrial Standards). Meanwhile, the guide 3 is made of, for example, martensite series stainless steel SUS 440C (Japanese Industrial Standards). The driving yoke 2 is secured into the guide 3 by shrink fitting or the like.

Figure 2:
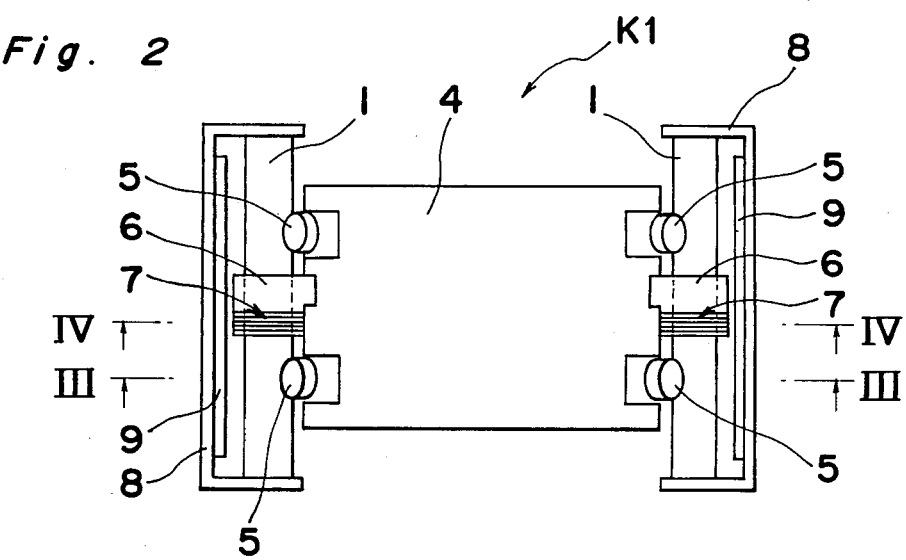
FIG. 2 is a top plan view of the linear motor of FIG. 1.

As shown in FIG. 2, a pair of the guide shafts 1 are provided in parallel with each other and are fixed to a pair of yokes 8, respectively. The yokes 8 are secured to a base frame (not shown).

Figure 3:
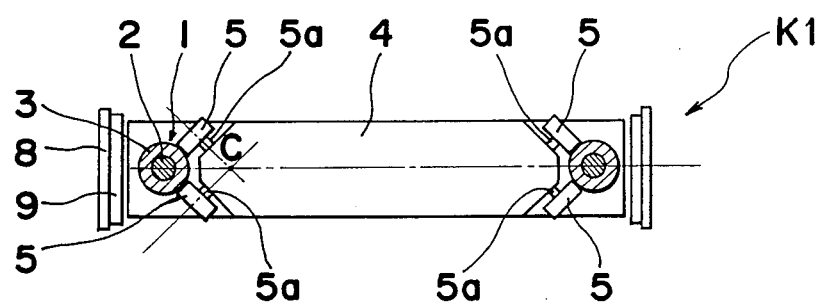
FIG. 3 is a sectional view taken along the line III—III in FIG. 2.
Figure 4:
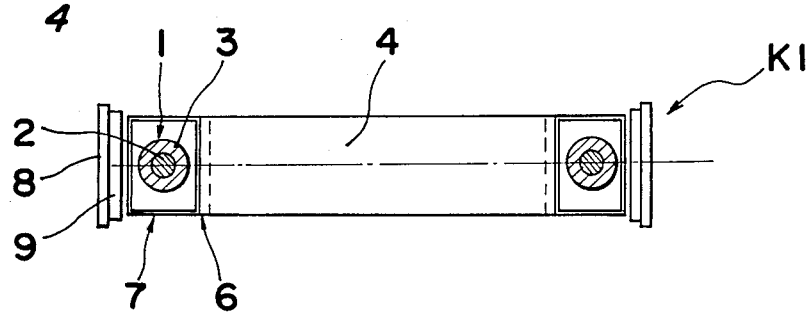
FIG. 4 is a sectional view taken along the line IV—IV in FIG. 2.

Meanwhile, an optical head of the magneto-optical disk drive is mounted on the movable portion 4. Each of a pair of actuating members 6 is provided at a central portion of each of opposite ends of the movable portion 4. The actuating members 6 are axially movably fitted around the guide shafts 1, respectively. A coil 7 is wound around each of the actuating members 6. A pair of permanent magnets 9 are secured to the yokes 8, respectively. Each of the coils 7 are placed in a magnetic field formed by each of the driving yokes 2 and each of the permanent magnets 9. As shown in FIGS. 3 and 4, two portions of each of the opposite ends of the movable portion 4 are obliquely recessed at an angle of 45° relative to upper and lower faces of the movable portion 4 in a vertical plane of the movable portion 4 so as to form a total of eight recesses in which guide rollers 5 are provided, respectively. The guide rollers 5 are brought into contact with each of the guide shafts 1 from above and from below so as to interpose each of the guide shafts 1 therebetween. Therefore, the movable portion 4 is guided by the guide shafts 1 through the guide rollers 5. A shaft 5a of each of the guide rollers 5 is inclined at an angle of 45° relative to a horizontal plane of the movable portion 4. As shown in FIG. 3, a point of intersection of the shafts 5a of a corresponding pair of the guide rollers 5 interposing therebetween the movable portion 4, i.e. a point C of application coincides, in height, with a center of each of the guide shafts 1. Meanwhile, the form of the actuating members 6 is determined such that a line of action of a driving force caused by an electromagnetic force which is applied between the coil 7 and the driving yoke 2 as well as the permanent magnet 9 at the time when the coils 7 have been energized is disposed at the centerline of the guide shaft 1, i.e. the centerline of the driving yoke 2.

In the above described arrangement of the linear motor K1, when the coils 7 have been energized, the driving force generated by electromagnetic action between the coil 7 and the driving yoke 2 as well as the permanent magnet 9 is disposed at the centerline of the guide shaft 1 so as to have a height identical with that of the point C of application of a corresponding pair of the guide rollers 5. Hence, the movable portion 4 is displaced smoothly in a rectilinear direction without pitching and thus, it becomes posible to perform stable recording and reproducing operations. Meanwhile, since the guide shaft 1 is of double construction constituted by the driving yoke 2 and the guide 3, the movable portion 4 can be made compact in size and light in weight, thereby resulting in improved motion characteristics of the movable portion 4. In addition, the linear motor K1 can also be made compact in size.

As is clear from the foregoing description, in accordance with the present invention, since the guide 3 for guiding the movable portion 4 and the driving yoke 2 are integrally formed with each other into the double construction by providing the driving yoke 2 inside the guide 3, the movable portion can be made compact in size and light in weight. Therefore, the motion characteristics of the movable portion 4 can be improved and the linear motor can also be made compact in size.

Furthermore, in accordance with the present invention, since the height of the line of action of the driving force applied between the driving yoke 2 and the energized coil 7 coincides with the height of the centerline of the guide shaft 1, the movable portion 4 can effect smooth rectilinear motion without pitching.

Figure 5:
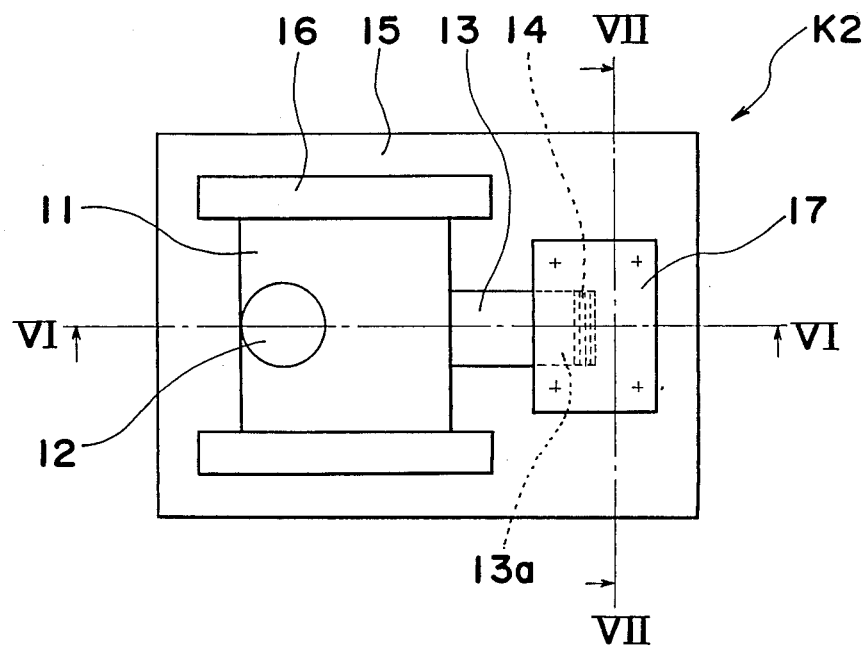
FIG. 5 is a top plan view of a linear motor according to a second embodiment of the present invention.
Figure 6:
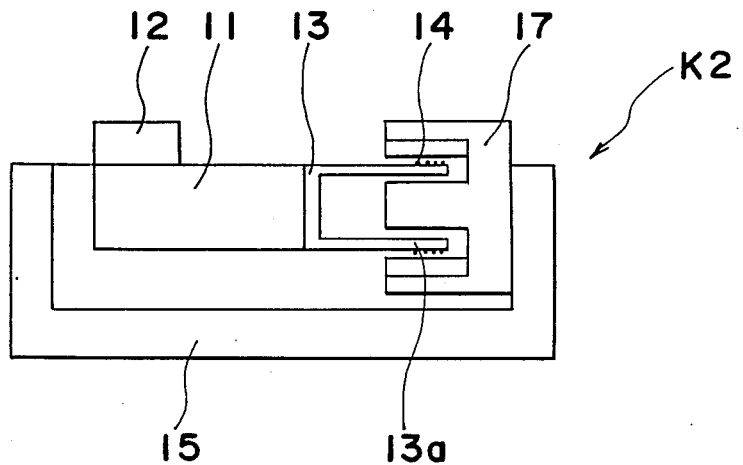
FIG. 6 is a sectional view taken along the line VI—VI in FIG. 5.
Figure 7:
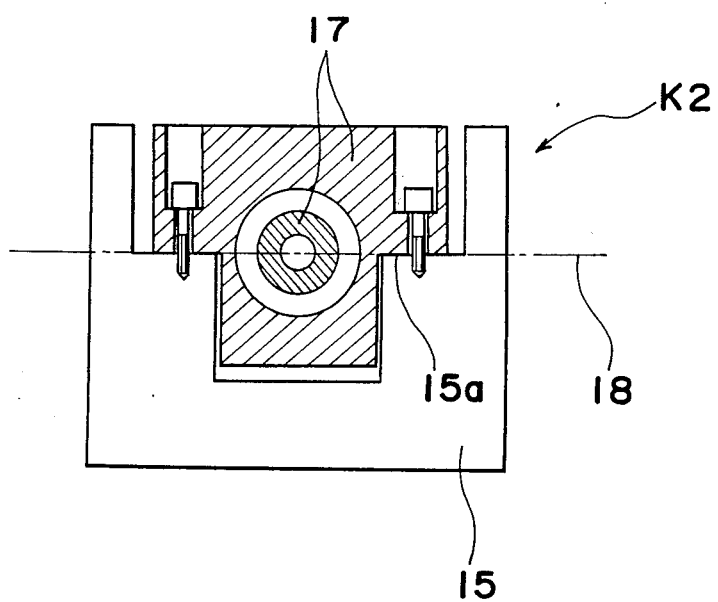
FIG. 7 is a sectional view taken along the line VII—VII in FIG. 5.

Referring to FIGS. 5 to 7, there is shown a linear motor K2 according to a second embodiment of the present invention. A head 12, for example an optical head is fixedly mounted on a movable portion 11 shown in FIG. 5. The optical head is used for recording, reproducing and erasing information of an information storage medium (not shown), such as an optical magnetic disk by using laser beams. An actuating member 13 is secured to the movable portion 11. An end portion 13a of the actuating member 13 is inserted into a magnetic gap defined by a driving yoke 17 of magnetic material. The driving yoke 17 is fixed to a mounting face 15a of a base 15. The base 15 has a neutral plane 18 identical in height with the mounting face 15a.

It is to be noted here that the term "neutral plane" is intended as a technical term used generally in referring to the strength of materials and means a plane free from tension and compression, which is disposed between a tensed plane and a compressed plane when, for example, a plate member has been bent. In the base 15 of the present invention, a neutral plane extending in the horizontal direction is taken into consideration. It is needless to say that the base 15 has a neutral plane also in the vertical direction. However, since bending and torsion in the horizontal direction is excessively small to a negligible degree as compared with those in the vertical direction, it is not necessary to consider the neutral plane present in the vertical direction.

In the above described arrangement of the linear motor K2, when a coil 14 wound around the end portion 13a of the actuating member 13 has been energized, a driving force is applied to the movable portion 11 by electromagnetic action between the coil 14 and the driving yoke 17. Simultaneously at this time, a reaction force acting as a reaction against the driving force is applied from the mounting face 15a to the base 15. Since the mounting face 15a coincides, in height, with the neurtral plane 18, a resonance mode of the base 15, which might be caused by the reaction force applied to the base 15 against the driving force, is not produced.

On the other hand, conventionally, the resonance mode of the base 15 has been caused. Namely, since no consideration has been given to the height of the mounting face 15a and the neutral plane 18 of the base 15, the resonance mode of the base 15 resulting from the reaction force applied to the base 15 against the driving force is produced. Hence, a pair of guides 16 for guiding the movable portion 11, which is mounted ont he base 15, are vibrated by the resonance of the base 15 and therefore, vibrate the movable portion 11. As a result, the head 12 fixedly mounted on the movable portion 11 is also vibrated by the guides 16 and thus, it has been impossible to perform stable recording, reproducing and erasing operations.

However, in accordance with the present invention, since the resonance mode of the base 15 can be prevented, guides 16 are not vibrated by the base 15 and thus, it becomes possible to perform stable recording, reproducing and erasing operations.

As will be seen from the description given so far, in the linear motor K2 of the present invention, since the height of the neutral plane 18 of the base 15 and the height of the point of application of the reaction force applied to the base 15 against the driving force are so set as to coincide with each other, the resonance mode of the base 15 resulting from the reaction force against the driving force is prevented. As a result, it becomes possible to perform stable recording, reproducing and erasing operations by using the head 12 mounted on the movable portion 11.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A linear motor for a magneto-optical disk drive comprising:
   a movable member;
   guide means for guiding said movable member;
   a driving yoke provided at a central portion of said guide means, wherein said guide means includes an outer peripheral guide portion surrounding said driving yoke;
   an actuating member provided at said movable member; and
   a coil wound around said actuating member such that said actuating member is axially movably fitted around said guide;
   whereby a height of a line of action of a driving force produced by electromagnetic action between said coil and said driving yoke is set to coincide with a height of a centerline of said guide.

2. A linear motor according to claim 1, further including a roller member mounted on said movable member wherein said movable member is guided by said guide means through said roller member.

3. A linear motor comprising:
   a movable member;
   guide means for guiding said movable member;
   a base; and
   a driving yoke mounted on said base such that said movable member is driven in a predetermined rectilinear direction by said linear motor along said guide means wherein said guide means includes a peripheral portion surrounding said driving yoke for smoothly guiding said movable member;
   whereby a height of a neutral plain of said base to coincide with a height of a line of action of a reaction force applied from said driving yoke to said base against an electromanetic force produced between said coil and said driving yoke.

4. A linear motor according to claim 3, further including an actuating member mounted on said movable member such that the electro magnetic force is applied to said movable member through said actuating member.

5. A linear motor for a magneto-optical disk drive comprising:
   a movable member for supporting an optical head;
   a pair of opposing guide shafts for guiding the reciprocable motion of said movable member, each of said guide shafts including a driving yoke provided at a central axial portion of a peripheral guide portion;
   an actuating member connected to said movable member and axially movably fitted to surround said guide shaft;
   a coil wound around at least a portion of each of said actuating members; and
   a pair of permanent magnets positioned on the opposing side of said movable member and parallel to said guide shafts;
   each of said coils being placed in a magnetic field formed by each of said driving yokes and each of said permanent magnets, respectively, whereby a driving force is produced to move said movable member to a height coinciding with a centerline height of said guide shafts.

6. A linear motor according to claim 5, further including roller members mounted on opposing sides of said movable member such that said movable member is guided by said guide shafts through said roller members.

7. A linear motor comprising:
   a movable member;
   guide means for guiding said movable member, said guide means being mounted on a mounting face of a base member;
   a magnetic driving yoke mounted on the mounting face of said base member such that said movable member is driven in a predetermined rectilinear direction by said linear motor, wherein said guide means includes a peripheral guide portion surrounding said magnetic driving yoke;
   an actuating member attached to said movable member and having an end portion thereof inserted into a gap of said magnetic driving yoke;
   a coil wound on a portion of said actuating member inserted into the gap of said magnetic driving yoke;
   said base member having a horizontal neutral plain set to coincide with a height of a line of reaction force applied from said driving yoke to said base member against an electromagnetic force produced between said coil of said actuating member and said driving yoke.

8. A linear motor according to claim 7, wherein the electromagnetic force is applied to said movable member through said actuating member.

9. A linear motor according to claim 1, wherein said driving yoke is a rolled steel rod having a high permeability and said peripheral guide portion is a cylindrically-shaped corrosion resistant material formed around said driving yoke whereby said guide means is a shaft of double construction.

10. A linear motor according to claim 3, wherein said driving yoke is a rolled steel rod having a high permeability and said peripheral guide portion is a cylindrically-shaped corrosion resistant material formed around said driving yoke whereby said guide means is a shaft of double construction.

* * * * *